United States Patent
Tuya et al.

(10) Patent No.: US 12,153,170 B2
(45) Date of Patent: Nov. 26, 2024

(54) GAMMA CAMERA IMAGING METHOD AND GAMMA CAMERA IMAGING DEVICE

(71) Applicant: Nuctech Company Limited, Haidian District (CN)

(72) Inventors: Gaowa Tuya, Beijing (CN); Chunxuan Hu, Beijing (CN); Kun Zhao, Beijing (CN); Zengxue Jin, Beijing (CN); Zhidan Ma, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 57 days.

(21) Appl. No.: 17/987,244

(22) Filed: Nov. 15, 2022

(65) Prior Publication Data
US 2023/0204798 A1 Jun. 29, 2023

(30) Foreign Application Priority Data
Dec. 28, 2021 (CN) .......................... 202111627470.7

(51) Int. Cl.
*G01T 1/167* (2006.01)
*G01T 1/29* (2006.01)

(52) U.S. Cl.
CPC ............ *G01T 1/167* (2013.01); *G01T 1/2921* (2013.01)

(58) Field of Classification Search
CPC ............................... G01T 1/167; G01T 1/2921
See application file for complete search history.

(56) References Cited

U.S. PATENT DOCUMENTS 6,628,983 B1    9/2003  Gagnon

FOREIGN PATENT DOCUMENTS

| CA | 110428765 A | | 11/2019 |
|---|---|---|---|
| CN | 110599562 A | | 12/2019 |
| CN | 111179365 A | | 5/2020 |
| CN | 111580149 A | | 8/2020 |
| JP | 2013122388 A | | 6/2013 |
| JP | 2020027081 A | * | 2/2020 |
| WO | WO2019014447 A1 | | 1/2019 |

OTHER PUBLICATIONS

Preliminary Search Report dated Apr. 8, 2024 issued for French Patent Application 2212281.
International Search Report dated Nov. 30, 2022 issued for International PCT Application No. PCT/CN2022/127110.
Notification of Grant dated Aug. 23, 2023 issued for Japanese Patent Application No. 2022-174910.

* cited by examiner

*Primary Examiner* — David P Porta
*Assistant Examiner* — Fani Polyzos Boosalis
(74) *Attorney, Agent, or Firm* — K&L Gates LLP (57) ABSTRACT

The present disclosure provides a gamma camera imaging method and a gamma camera imaging device. The method includes: selecting, from energy spectrums captured by a gamma camera on one or more radioactive materials, one or more energy ranges of each radioactive material among the one or more radioactive materials as one or more monitored energy regions of the radioactive material; performing image reconstruction on the monitored energy regions of each radioactive material among the one or more radioactive materials; performing normalization on images obtained through the image reconstruction; and performing superimposing on the normalized images to form a composite image.

16 Claims, 5 Drawing Sheets

GAMMA CAMERA IMAGING METHOD AND GAMMA CAMERA IMAGING DEVICE

CROSS REFERENCE OF RELATED APPLICATIONS

This application is based upon and claims priority to Chinese Patent Application No. 202111627470.7, filed on Dec. 28, 2021, which is incorporated herein by reference in its entirety.

TECHNICAL FIELD

The present application relates to the technical field of gamma camera, in particular to a gamma camera imaging method and a gamma camera imaging device.

BACKGROUND

A gamma camera is primarily used in the field of nuclear security and test to dynamically or statically image a radiation field of a radioactive material contamination area, and the result image is used in combination with an image resulted from an optical imaging process to obtain radioactive material distribution information.

An existing gamma camera generally utilizes a linear data processing method, which does not make a distinction among received signals and performs projection image restoration and original image reconstruction using all effective energy bands of signals. After the image reconstruction, there often appears statistical fluctuations and shadows in the background of bright spots due to quantization losses and approximation processes during the data processing. Then, a screening process is used for image areas by using a brightness threshold or a significance threshold to select only some of the image areas having more obvious images to be used in combination with optical images.

SUMMARY

According to an aspect of the present application, there is provided a gamma camera imaging method, including: selecting, from energy spectrums captured by a gamma camera on one or more radioactive materials, one or more energy ranges of each radioactive material among the one or more radioactive materials as one or more monitored energy regions of the radioactive material; performing image reconstruction on the monitored energy regions of each radioactive material among the one or more radioactive materials; performing normalization on images obtained through the image reconstruction; and performing superimposing on the normalized images to form a composite image.

In some embodiments, the selecting includes: traversing the energy spectrums to find peaks and comparing the peaks with energies of branches of respective radioactive materials recorded in a predetermined nuclide bank to determine the one or more radioactive materials; determining, for each radioactive material among the one or more radioactive materials, a part of branches of the radioactive material with a relatively higher branch ratio or lower energy as one or more branches of the radioactive material to be monitored; and determining, for each branch among the one or more branches of the radioactive material, an energy range centered on a central energy of the branch and having a width of a half-height width of a peak corresponding to the branch as one of the one or more monitored energy regions of the radioactive materials.

In some embodiments, the gamma camera imaging method further includes: determining, for each of the images obtained through the image reconstruction, whether there is a closed area in the image; and adjusting, in a case where there is a closed region in the image and if a ratio of contrast of the closed area with respect to contrast of a background area outside the closed area is less than a predetermined threshold, the energy ranges of the monitored energy regions corresponding to the image adaptively.

In some embodiments, the adaptively adjusting includes: gradually expending or reducing an energy region to be adjusted in a predetermined energy step, until the ratio of contrast of the closed area with respect to contrast of a background area outside the closed area reaches the predetermined threshold.

In some embodiments, the gamma camera imaging method further includes: discarding, in a case where there is not a closed region in the image, the energy ranges of the monitored energy regions corresponding to the image.

In some embodiments, the gamma camera imaging method further includes: discarding, in a case where there is not a closed region in the image, the energy ranges of the monitored energy regions corresponding to the image after a predetermined time period.

According to another aspect of the present application, there is provided a gamma camera imaging device, including: a selection module configured to select, from energy spectrums captured by a gamma camera on one or more radioactive materials, one or more energy ranges of each radioactive material among the one or more radioactive materials as one or more monitored energy regions of the radioactive material; an image reconstruction module configured to perform image reconstruction on the monitored energy regions of each radioactive material among the one or more radioactive materials; a normalization module configured to perform normalization on images obtained through the image reconstruction; and a superimposing module configured to perform superimposing on the normalized images to form a composite image.

In some embodiments, the selection module includes: a peak-finding module configured to traverse the energy spectrums to find peaks and comparing the peaks with energies of branches of respective radioactive materials recorded in a predetermined nuclide bank to determine the one or more radioactive materials; a branch determination module configured to determine, for each radioactive material among the one or more radioactive materials, a part of branches of the radioactive material with a relatively higher branch ratio or lower energy as one or more branches of the radioactive material to be monitored; and an energy region determination module configured to determine, for each branch among the one or more branches of the radioactive material, an energy range centered on a central energy of the branch and having a width of a half-height width of a peak corresponding to the branch as one of the one or more monitored energy regions of the radioactive materials.

In some embodiments, the image reconstruction module includes: a closed region determination module configured to determine, for each of the images obtained through the image reconstruction, whether there is a closed area in the image; and an energy region adjustment module configured to adjust, in a case where there is a closed region in the image and if a ratio of contrast of the closed area with respect to contrast of a background area outside the closed area is less than a predetermined threshold, the energy ranges of the monitored energy regions corresponding to the image adaptively.

In some embodiments, the energy region adjustment module is further configured to gradually expend or reduce an energy region to be adjusted in a predetermined energy step, until the ratio of contrast of the closed area with respect to contrast of a background area outside the closed area reaches the predetermined threshold.

In some embodiments, the image reconstruction module further include: a discarding module configured to discard, in a case where there is not a closed region in the image, the energy ranges of the monitored energy regions corresponding to the image. In some embodiments, the image reconstruction module further include: a discarding module configured to discard, in a case where there is not a closed region in the image, the energy ranges of the monitored energy regions corresponding to the image after a predetermined time period.

According to another aspect of the present application, there is provided a gamma camera imaging device, including: a memory storing instructions; a processor configured to execute the instructions stored in the memory to perform the gamma camera imaging method as discussed above.

According to another aspect of the present application, there is provided a computer readable storage medium, storing instructions, which are executable by a processor to perform the gamma camera imaging method as discussed above.

According to another aspect of the present application, there is provided a gamma camera, including the gamma camera imaging device as discussed above.

BRIEF DESCRIPTION OF THE DRAWINGS

The features and advantages of the present application will be more clearly understood by reference to the accompanying drawings. The drawings are schematic and should not be understood to impose any limitation on the present application. In the drawings.

DETAILED DESCRIPTION

A monitored result of a gamma camera is presented in a form of an image, from which to human eyes observe to determine types of radioactive materials and distribution thereof, so whether the radioactive materials can be imaged is a key factor to affect the monitored result of the gamma-camera. A basic requirement of the imaging is that a number of gamma events emitted by radiation sources and statistically observed exceeds a number of gamma events in an ambient background by a certain proportion, that is, an ideal analysis result can be obtained through statistical and image processing methods only when a signal-to-noise ratio reaches a certain threshold.

In an actual application, it is difficult to achieve a specified signal-to-noise ratio. The reason is that a detection efficiency for high-energy particles is not high enough due to limitations of size and materials of detectors, and there is a considerable amount of ambient background noises in the background for low-energy particles. Therefore, a conventional gamma camera generally does not have a sufficient long detection distance and requires relatively long measurement time.

Figure 1:
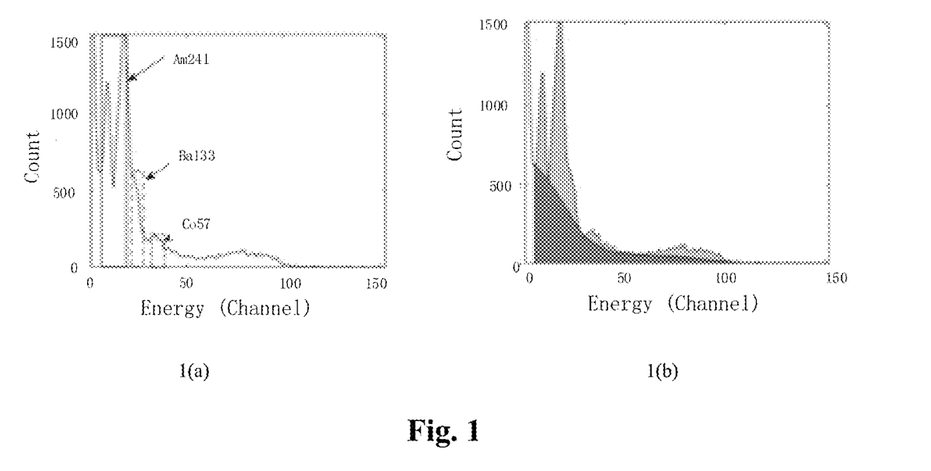
FIG. 1 shows a diagram of an energy spectrum captured by a gamma camera from three radioactive sources (Am241, Co57, and Ba133)

FIG. 1 shows a diagram of an energy spectrum captured by a gamma camera from three radioactive sources (Am241, Co57, and Ba133). FIG. 1 is shown as FIG. 1(a) and FIG. 1(b), where the horizontal axis represents the energy, in terms of a channel value, and the vertical axis represents the count value. In FIG. 1(a), an energy spectrum region generated by Am241 is marked with a solid line, an energy spectrum region generated by Co57 is marked with a dotted line, and an energy spectrum region generated by Ba133 is marked with a dashed line. In FIG. 1(b), a light gray area provides valid information, while a dark gray area provides noise information (in the example, full-energy peaks are used instead of Compton scattering flat data as valid information for imaging). For data processing of a gamma camera, the gamma camera can ensure better imaging only when a ration of an area of the light gray region with respect to an area of the dark gray region reaches a certain ratio.

In a case of imaging, brightness of bright spots formed by respective radioactive point sources in the reconstructed image is very different if there is a large difference in strength and weakness of the radioactive materials. A bright spot of a weaker radioactive source is easily submerged in a statistically fluctuant background formed by a stronger radioactive source. Since a brightness value of the bright spot of the weaker radioactive source is difficult to exceed a selection threshold, the bright spot of the weaker radioactive source will not be selected to be used for in combination with optical images, or even if it does, its brightness is very weak and difficult to be observed with human eyes.

Figure 2:
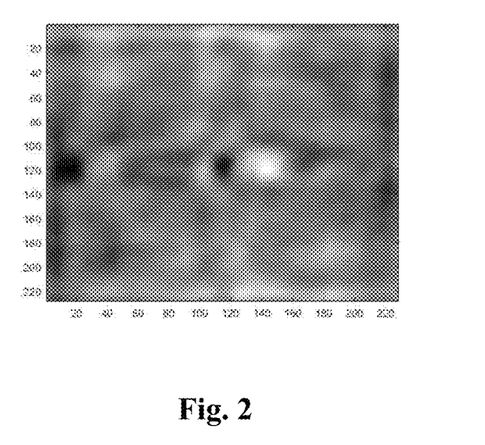
FIG. 2 shows a diagram of an example image obtained through image reconstruction by a gamma camera using a conventional method from the energy spectrum of the three radioactive sources (Am241, Co57, and Ba133) of FIG. 1.

FIG. 2 shows a diagram of an example image obtained through image reconstruction by a gamma camera using a conventional method from the energy spectrum of the three radioactive sources (Am241, Co57, and Ba133) of FIG. 1. In FIG. 2, the horizontal axis and the vertical axis respectively represent pixel scales of a result image of a gamma camera. In this image, only the bright spots represented by the two peaks of Am241 in the energy spectrum can be observed, not Co57 and Ba133. As a result, conventional methods fail to adequately represent information from all radioactive sources.

According to the embodiment of the present application provides a gamma camera imaging method and apparatus, which can make full use of the effective information of each radioactive source, optimized display of radioactive material distribution in the field of view.

Figure 3:
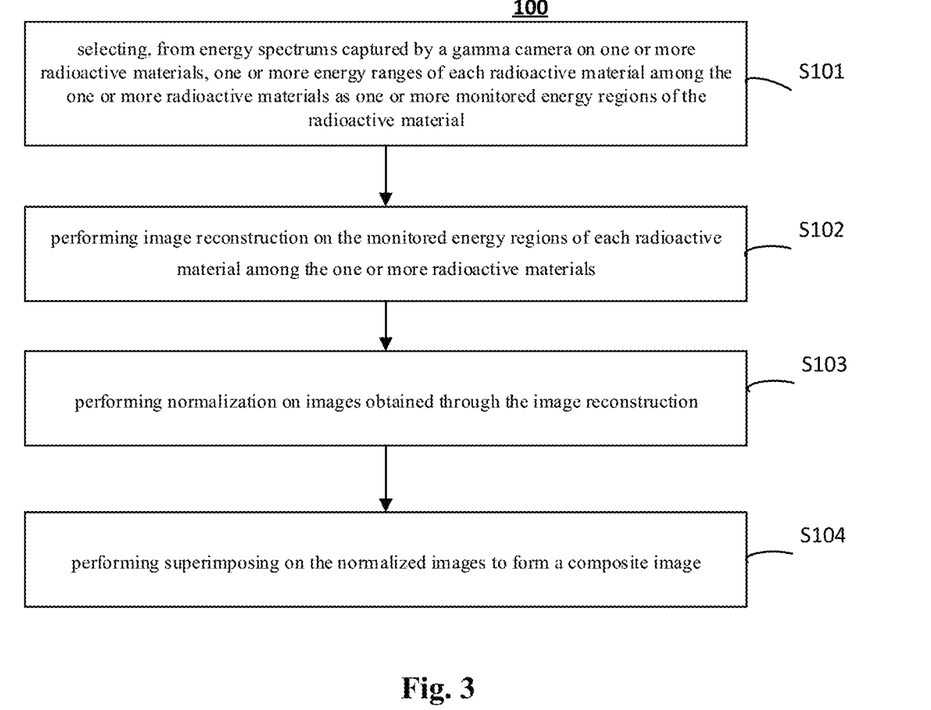
FIG. 3 shows a flowchart of a gamma camera imaging method according to an embodiment of the present application.

FIG. 3 shows a flowchart of a gamma camera imaging method according to an embodiment of the present application. As shown in FIG. 3, the gamma camera imaging method 100 according to an embodiment of the present application includes S101-S104.

In step S101, from energy spectrums captured by a gamma camera on one or more radioactive materials, one or more energy ranges of each radioactive material among the one or more radioactive materials are selected as one or more monitored energy regions of the radioactive material.

For step S101, in some embodiments, the selection of the monitored energy regions may include: traversing the energy spectrums to find peaks and comparing the peaks with energies of branches of respective radioactive materials recorded in a predetermined nuclide bank to determine the one or more radioactive materials; determining, for each radioactive material among the one or more radioactive materials, a part of branches of the radioactive material with a relatively higher branch ratio or lower energy as one or more branches of the radioactive material to be monitored; and determining, for each branch among the one or more branches of the radioactive material, an energy range centered on a central energy of the branch and having a width of a half-height width of a peak corresponding to the branch as one of the one or more monitored energy regions of the radioactive materials.

It should be understood that for one radioactive material, one monitored energy regions may be selected, or multiple monitored energy regions may be selected, and for different radioactive materials, their monitored energy regions may be overlapped with each other. In addition, with regard to the determination of the branches of each radioactive material, two criteria (i.e. a branch ratio and an energy) are mainly taken into account. This is because detectors of the gamma camera have a lower efficiency in detection of high-energy gamma particles and thus it is preferable to select a branch with lower energies; and the higher the branch ratio, the more gamma particles the same amount of radioactive material produces and thus is preferable to select a branch with a larger branch ratio. It should be understood that the terms "lower" and "higher" as used herein are terms relative to various branches of the radioactive material.

In step S102, image reconstruction is performed on the monitored energy regions of each radioactive material among the one or more radioactive materials.

For step S102, for the image reconstruction, a commonly-used decoding method or statistical decoding method may be used as required.

In some embodiments, the gamma camera imaging method according to the present application may further include: determining, for each of the images obtained through the image reconstruction, whether there is a closed area in the image; and adjusting, in a case where there is a closed region in the image and if a ratio of contrast of the closed area with respect to contrast of a background area outside the closed area is less than a predetermined threshold, the energy ranges of the monitored energy regions corresponding to the image adaptively. In some embodi-ments, the adaptively adjustment may include: gradually expending or reducing an energy region to be adjusted in a predetermined energy step, until the ratio of contrast of the closed area with respect to contrast of a background area outside the closed area reaches the predetermined threshold. Energy range to be adaptively adjusted is determined by a resolution of the detectors and a distance between adjacent peaks. In general, if energy calibration of the gamma camera is relative accurate, a degree of the adaptive adjustment is not too large, for example, a range of 2 to 5 semi-height wides can generally be selected.

The gamma camera can operate in a static measurement mode and in a dynamic measurement mode. In the static measurement mode, the method according to the present application may further include: discarding, in a case where there is not a closed region in the image, the energy ranges of the monitored energy regions corresponding to the image. Alternatively, in the dynamic measurement mode, the method according to the present application may further include: discarding, in a case where there is not a closed region in the image, the energy ranges of the monitored energy regions corresponding to the image after a predetermined time period. In the dynamic measurement mode, dynamic movement of the radioactive materials may cause a closed area to appear in the reconstructed image, so data discarding is carried out after a predetermined time period of continuous observation. By discarding data of a monitored energy region that cannot be imaged, not only an amount of computation can be reduced, but also an influence of noise floor can be reduced.

In step S103, images obtained through the image reconstruction are normalized. For step S103, in the normalization, a pixel value is normalized from a maximum and minimum value interval to a zero to one interval. The image are normalized to a same maximum value, which equivalently enhances an image of a weak source.

In step S104, the normalized images are superimposed to form a composite image. For step S104, superimposing of the image may employ different color channels to clearly present distribution of the respective radioactive materials.

According to the gamma camera imaging method according to an embodiment of the present application, data of each monitored energy region is analyzed separately, then other information outside the energy region is excluded, so only background events in the energy region constitute noise, which is reduced much with respect to the overall background, and thus the method can effectively improve the signal-to-noise ratio. Further, another advantage of the gamma camera imaging method according to the embodiment of the present application where data of each monitored energy region is separately analyzed is that when movement of a radioactive material is detected in real time in the dynamic mode, only the projected image of the monitored energy region of the radioactive material can be cleared to refresh, without clearing other monitored energy regions. Thus, for the same monitored energy regions, imaging of the moving material and the stationary material does not affect each other.

Figure 4:
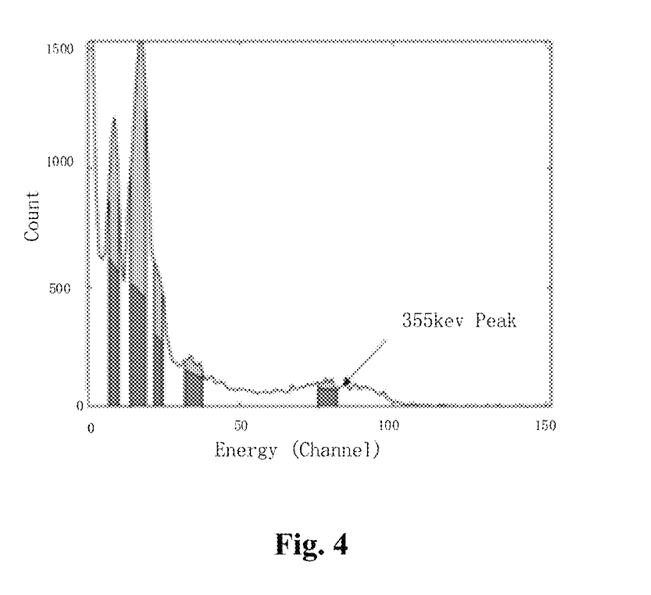
FIG. 4 shows a diagram of an energy spectrum captured by a gamma camera from three radioactive sources (Am241, Co57, and Ba133)

FIG. 4 shows a diagram of an energy spectrum captured by a gamma camera from three radioactive sources (Am241, Co57, and Ba133). In FIG. 4, the horizontal axis represents the energy, in terms of a channel value, and the vertical axis represents the count value; and a light gray area provides valid information, while a dark gray area provides noise information. As shown in FIG. 4, the gamma camera imaging method according to the embodiment of the present application determines four monitored energy regions from an total energy spectrum, including two branches of Am241 (shown in the figure as peaks of the spectrum, i.e. the first peak and the second peak), a branch of Co57 (referred to as the third peak), a branch of Ba133 (referred to as the fourth peak), which are optimal signal-to-noise ratio regions. For these four monitored energy regions, imaging is performed separately. The characteristic peak at 355 kev of Ba133 cannot be used for imaging because its optimal signal-to-noise ratio region does not meet threshold requirements.

Figure 5:
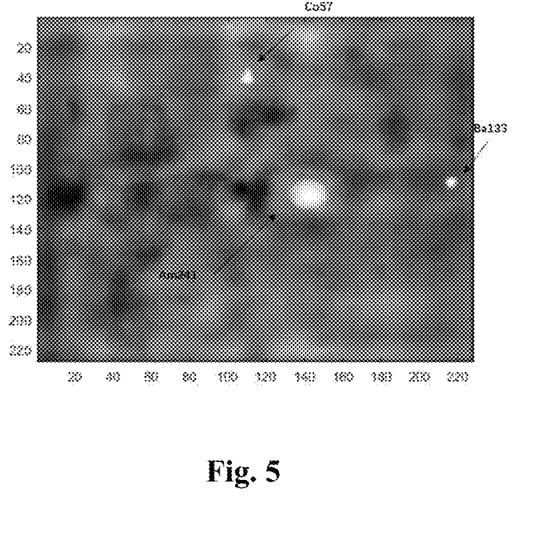
FIG. 5 shows a diagram of a result image obtained through image reconstruction by a gamma camera using the gamma camera imaging method according to an embodiment of the present application from the three radioactive sources (Am241, Co57, and Ba133) of FIG. 4.

Images obtained through image reconstruction of these four monitored energy regions are normalized, and the normalized images are superimposed to form a composite image. FIG. 5 shows a diagram of a result image obtained through image reconstruction by a gamma camera using the gamma camera imaging method according to an embodiment of the present application from the three radioactive sources (Am241, Co57, and Ba133) of FIG. 4. In FIG. 5, the first peak and the second peak are used for the reconstruction to yield an image of Am241, the third peak is sued for the reconstruction to yield an image of Ba133, and the fourth peak is used for the reconstruction to yield an image of Co57, positions of which are indicated in the figure with arrows.

Figure 6:
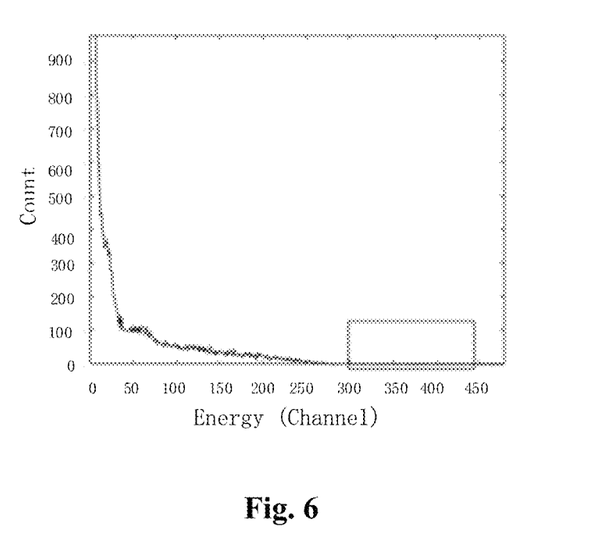
FIG. 6 shows a diagram of an energy spectrum captured by a gamma camera from a high-energy radioactive material (e.g., Co60)

The image obtained by the gamma camera imaging method according to the embodiment of the present application (as shown in FIG. 5) contains more information about the radioactive materials than the image obtained by the conventional method (as shown in FIG. 2). Because the gamma camera does not have a sufficient detection efficiency and energy resolution, there is a higher probability that weaker peaks are overlapped with each other, and thus a conventional peak-finding method based on a shape of the graph cannot find out peaks well. In contrast, the method here uses a traversal method similar to peak-finding in a nuclide bank. Because there are not much types of radioactive materials that can be detected by the gamma camera, even if all detectable radioactive materials are traversed, the amount of calculation and real-time processing speed are within an acceptable range. In some special cases, such as for high-energy radioactive materials (such as Co60), because the signal-to-noise ratio is improved, only a few dozen of events can be accumulated to make a better image, which can reduce the measurement time. For example, the optimal imaging energy region in the energy spectrum of Co60 in FIG. 6 is in the 300th to 450th channels (shown in the figure as a box). Although no peak is not observed on the energy spectrum, the method according to the embodiment of the present application can obtain a very obvious reconstruction image.

The method according to the embodiment of the present application mainly shows types and distribution of radioactive materials in the field of view of a gamma camera. For the application in the gamma camera, presence and location information of radioactive materials are more important than their relative strength, so if it is required to check strength and weakness information of the radioactive materials, an ordinary display mode may be used for further display.

Figure 7:
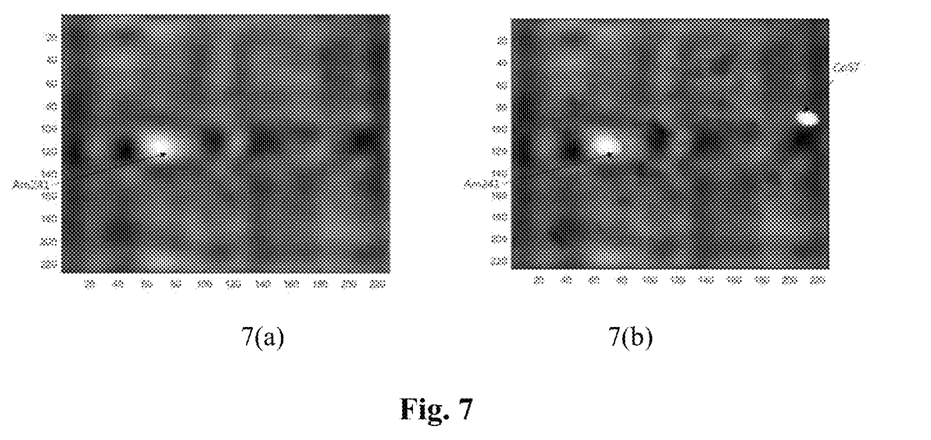
FIG. 7 shows a comparison diagram of a result image obtained through image reconstruction by a gamma camera using a conventional method from two radioactive sources (Am241, and Co57) and a result image obtained through image reconstruction by a gamma camera using the gamma camera imaging method according to an embodiment of the present application from the same radioactive sources.

As another example, FIG. 7 shows a comparison diagram of a result image obtained through image reconstruction by a gamma camera using a conventional method from two radioactive sources (Am241, and Co57) and a result image obtained through image reconstruction by a gamma camera using the gamma camera imaging method according to an embodiment of the present application from the same radioactive sources. FIG. 7 is shown as to FIG. 7 (a) on the left and FIG. 7 (b) on the right, wherein FIG. 7 (a) is a gamma image obtained by the conventional method, and FIG. 7(b) is a gamma image obtained by the method according to the embodiment of the present application. Within a radiant field of view measured by the gamma camera, there are two radioactive point sources, i.e. Am241 and Co57. From the image on the left, only a bright spot of Am241 can be seen in the middle of the left side, because the Am241 source has a large activity and the background is very bright as a whole, so that it obscures a bright spot of Co57. From the image on the right, images of the two point sources (Am241, Co57) are all obvious (Am241 on the left, Co57 on the right). It should be noted that the method according to the embodiment of the present application may assign respective reconstructed image with different color channels so that the result gamma image is a color image. For example, Am241 may be represented in cyan, Co57 may be displayed in red. The assigning of color channels may be different from the example and can be set as required.

Figure 8:
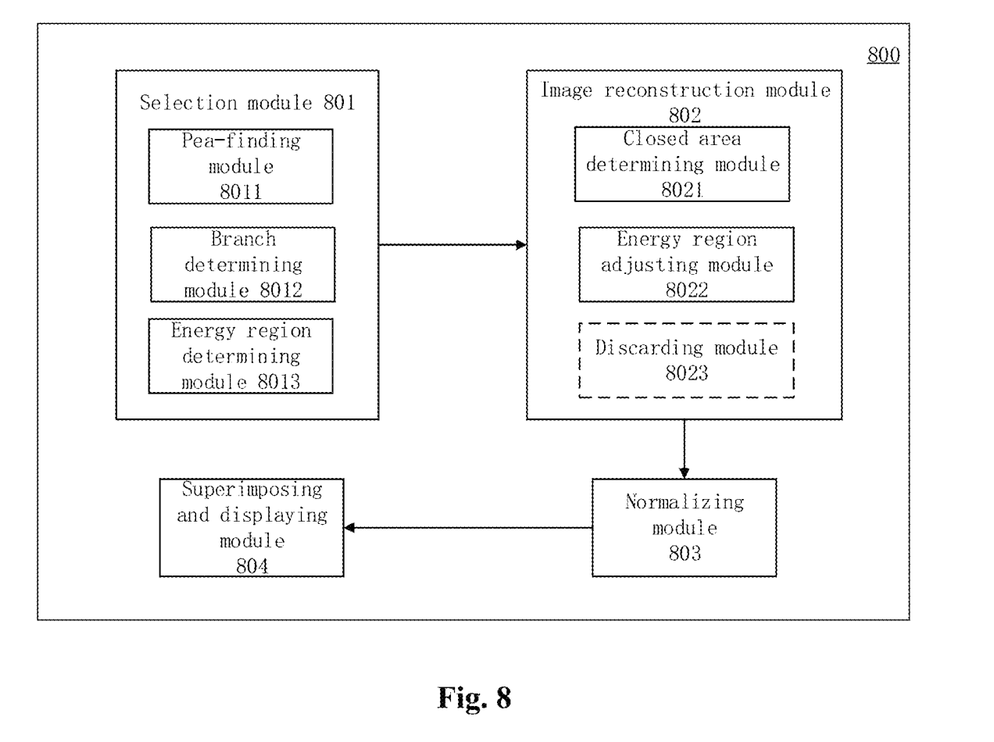
FIG. 8 shows a block diagram of a gamma camera imaging device according to an embodiment of the present application.

A gamma camera imaging device according to an embodiment of the present application will be described hereinafter. FIG. 8 shows a block diagram of a gamma camera imaging device according to an embodiment of the present application. As shown in FIG. 8, the gamma camera imaging device 800 according to the embodiment of the present application includes a selection module 801, an image reconstruction module 802, a normalization module 803, and a superimposing module 804. Specifically, the selection module 801 is configured to select, from energy spectrums captured by a gamma camera on one or more radioactive materials, one or more energy ranges of each radioactive material among the one or more radioactive materials are selected as one or more monitored energy regions of the radioactive material. The image reconstruction module 802 is configured to perform image reconstruction on the monitored energy regions of each radioactive material among the one or more radioactive materials. The normalization module 803 is configured to perform normalization on the images obtained through the image reconstruction. The superimposing module 804 is configured to perform superimposing on the normalized images to form a composite image.

In some embodiments, the selection module 801 may include: a peak-finding module 8011 configured to the energy spectrums to find peaks and comparing the peaks with energies of branches of respective radioactive materials recorded in a predetermined nuclide bank to determine the one or more radioactive materials; a branch determination module 8012 configured to determine, for each radioactive material among the one or more radioactive materials, a part of branches of the radioactive material with a relatively higher branch ratio or lower energy as one or more branches of the radioactive material to be monitored; and an energy region determination module 8013 configured to determine, for each branch among the one or more branches of the radioactive material, an energy range centered on a central energy of the branch and having a width of a half-height width of a peak corresponding to the branch as one of the one or more monitored energy regions of the radioactive materials.

In some embodiments, the image reconstruction module 802 may include: a closed region determination module 8021 configured to determine, for each of the images obtained through the image reconstruction, whether there is a closed area in the image; and an energy region adjustment module 8022 configured to adjust, in a case where there is a closed region in the image and if a ratio of contrast of the closed area with respect to contrast of a background area outside the closed area is less than a predetermined threshold, the energy ranges of the monitored energy regions corresponding to the image adaptively.

In some embodiments, the energy region adjustment module 8022 may be further configured to: gradually expend or reduce an energy region to be adjusted in a predetermined energy step, until the ratio of contrast of the closed area with respect to contrast of a background area outside the closed area reaches the predetermined threshold.

In some embodiments, the image reconstruction module 802 may further include a discarding module 8023 configured to discard, in a case where there is not a closed region in the image, the energy ranges of the monitored energy regions corresponding to the image. In some embodiments, the discarding module 8023 may be further configured to: discard, in a case where there is not a closed region in the image, the energy ranges of the monitored energy regions corresponding to the image after a predetermined time period.

The above-described gamma camera imaging method and device according to the embodiment of the present application can be used in a gamma camera to obtain an enhanced gamma image, which will be used in combination with an optical image to identify radioactive materials and distribution information thereof. According to the gamma camera imaging method and gamma camera imaging device in the present application, every monitored energy region of every radioactive material is separately analyzed, which is able to take all radioactive materials into account, and thereby noise floor can be reduced and a signal-to-noise ratio can be improved. Further, according to the gamma camera imaging method and gamma camera imaging device in the present application, only projected images of moving radioactive materials need to be refreshed in a dynamic measurement mode, so that imaging of the moving materials and imaging of stationary materials does not affect each other.

In some embodiments, according to the present application, there is further provided a gamma camera imaging device, including: a memory storing instructions; a processor configured to execute the instructions stored in the memory to execute the gamma camera imaging method described above.

In some embodiments, according to the present application, there is further provided a gamma camera, including the above-described gamma camera imaging device.

Figure 9:
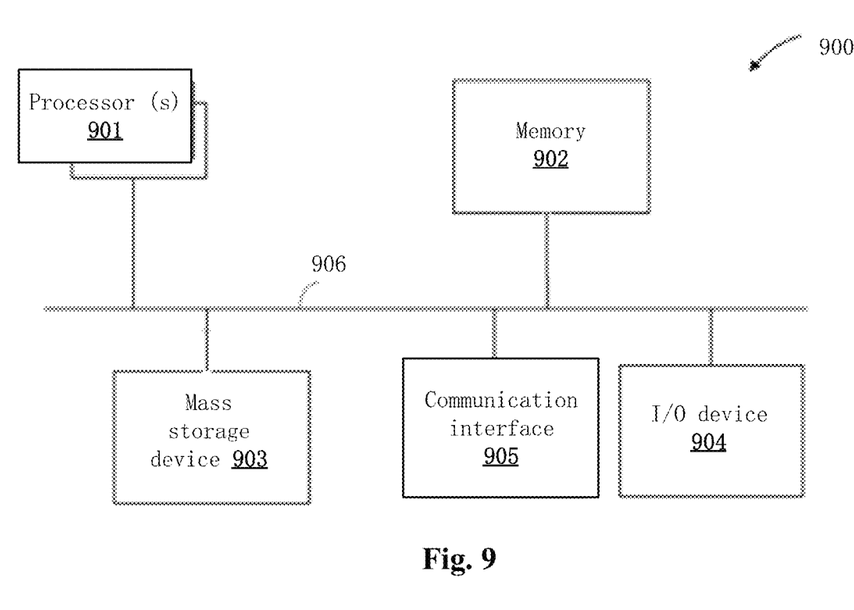
FIG. 9 shows an example block diagram of a computing device which is applicable to implement a gamma camera imaging device according to an embodiment of the present application.

FIG. 9 shows an example block diagram of a computing device which is applicable to implement a gamma camera imaging device according to an embodiment of the present application. As shown, the computing device 900 include one or more processors or processor cores 901 and a memory 902. For the present application (including claims), the terms "processor" and "processor core" may be considered synonymous, unless it is expressly indicated otherwise. The processor 901 may include any type of processor, such as a central processing unit, a microprocessor, and the like. The processor 901 may be implemented as an integrated circuit having multiple cores, e.g., a multi-core microprocessor. In an embodiment, the memory 902 may be a system memory. In some embodiments, the memory 902 may be integrated with the processor 901. The computing device 900 may include a mass storage device 903 (e.g., a disk, a hard disk drive, a volatile memory (e.g., dynamic random-access memory, DRAM), a compact disc read-only memory (CD-ROM), a digital versatile disk (DVD), and the like). In general, the memory 902 and/or the mass storage device 903 may be any type of temporary and/or permanent storage, including, but not limited to, volatile and non-volatile memory, optical, magnetic and/or solid-state mass storage, and the like. The volatile memory may include, but is not limited to, a static and/or dynamic random access memory. The nonvolatile memory may include, but is not limited to, an electrically erasable programmable read-only memory, a phase change memory, a resistive memory, and the like.

The computing device 900 may further include an input/output (I/O) device 904 (e.g., a display (e.g., a touch screen display), a keyboard, a cursor control, a remote control, a game controller, an image capture device, etc.) and a communication interface 905 (e.g., a network interface card, a modem, an infrared receiver, a radio receiver (e.g., Bluetooth), and so on). The communication interface 905 may communicate with other devices in a wired or wireless manner to exchange data. For example, through the communication interface 905, the gamma images may be transmitted to be used in combination with optical images.

The components of the computing device 900 may be coupled to each other via a system bus 906, which represents one or more buses. In the case of multiple buses, they can be bridged by one or more bus bridges (not shown). Each of these components may perform its traditional functions known in the art. Specifically, the memory 902 and the mass storage device 903 may be employed to store a working copy and a permanent copy of programming instructions for operation of the gamma camera imaging device. The components may be implemented by assembly instructions supported by the processor(s) 901 or any high-level language which may be compiled into such instructions. A permanent copy of the programming instructions may be placed in the mass storage device 903 at the factory, or may be distributed at the field, for example, by a distribution medium (not shown) (e.g., a compact disk (CD)), or via a communication interface 905 (from a distributor (not shown)). Thus, in some embodiments, according to the present application, there is provided a computer-readable storage medium storing instructions, which are executable by the processor to perform the gamma camera imaging method as discussed above.

The number, the capability and/or capacity of the components may vary, depending on whether the computing device 900 is used as a fixed computing device, or is used as a mobile computing device. In various implementations, the computing device 900 may include one or more components of a laptop computer, a netbook, a notebook, an ultrabook, a smart phone, a tablet device, a personal digital assistant (PDA), an ultra-mobile PC, a mobile phone, or a digital camera. In another implementation, the computing device 900 may be any other electronic device which is able to process data.

The above detailed description of embodiments of the present application covers many specific details in order to provide a comprehensive understanding of the present application. However, it will be apparent to a person skilled in the art that the present application may be implemented without some of these specific details. The above description of the embodiments is only intended to provide a clearer understanding of the present application by illustrating examples of the present application. The present application is by no means limited to any specific configuration and methodological steps proposed below, but covers any modification, replacement and improvement of the relevant elements, components and method steps without departing from the teachings of the present application.

It should be noted that in the claims, the words "include" or "comprise" do not exclude presence of elements or assemblies that are not listed in the claims. The article "an"

or "a" that precedes a component or assembly does not exclude existence of more than one such component or assembly.

Further, it should also be noted that the language used in the present specification is provided primarily for readability and teaching purposes, and not to explain or define the subject matter of the present application. Thus, without departing from the gist and scope of the appended claims, many modifications and changes may be made by a person skilled in the art. With regard to the scope of the present application, the descriptions here are illustrative and not restrictive, and the scope of the present application is limited by the appended claims.

What is claimed is:

1. A gamma camera imaging method, comprising:
    selecting, from energy spectrums captured by a gamma camera of one or more radioactive materials to be detected, one or more energy ranges of each radioactive material among the one or more radioactive materials as one or more monitored energy regions of the radioactive material;
    performing image reconstruction on each of the monitored energy regions of each radioactive material among the one or more radioactive materials;
    performing normalization on images obtained through the image reconstruction such that maximum pixel values of the respective images are normalized to a same value to obtain normalized images; and
    performing superimposing on the normalized images to form a composite image.

2. The gamma camera imaging method according to claim 1, wherein the selecting comprises:
    traversing the energy spectrums to find peaks and comparing the peaks with energies of branches of the respective radioactive materials recorded in a predetermined nuclide bank to determine the one or more radioactive materials;
    determining, for each radioactive material among the one or more radioactive materials, a part of branches of the radioactive material with a relatively higher branch ratio or lower energy as one or more branches of the radioactive material to be monitored; and
    determining, for each branch among the one or more branches of the radioactive material, an energy range centered on a central energy of the branch and having a width of a half-height width of a peak corresponding to the branch as one of the monitored energy regions of the radioactive material.

3. The gamma camera imaging method according to claim 1, further comprising:
    determining, for each of the images obtained through the image reconstruction, whether there is a closed area in the image; and
    adjusting, in a case where there is a closed region in the image and if a ratio of contrast of the closed area with respect to contrast of a background area outside the closed area is less than a predetermined threshold, the energy ranges of the monitored energy regions corresponding to the image adaptively.

4. The gamma camera imaging method according to claim 3, wherein the adaptively adjusting comprises:
    gradually expending or reducing an energy region to be adjusted in a predetermined energy step, until the ratio of contrast of the closed area with respect to contrast of a background area outside the closed area reaches the predetermined threshold.

5. The gamma-camera imaging method according to claim 3, further comprising:
    discarding, in a case where there is not a closed region in the image, the energy ranges of the monitored energy regions corresponding to the image.

6. The gamma camera imaging method according to claim 3, further comprising:
    discarding, in a case where there is not a closed region in the image, the energy ranges of the monitored energy regions corresponding to the image after a predetermined time period.

7. The gamma camera imaging method according to claim 1, wherein the superposing comprises:
    superimposing the normalized images in different color channels to form the composite image.

8. A gamma camera imaging device, comprising:
    a memory storing instructions; and
    a processor configured to execute the instructions stored in the memory to perform the gamma camera imaging method according to claim 1.

9. A computer-readable storage medium storing instructions, which are executable by a processor to perform the gamma camera imaging method according to claim 1.

10. A gamma camera imaging device, comprising:
    a selection module configured to select, from energy spectrums captured by a gamma camera of one or more radioactive materials to be detected, one or more energy ranges of each radioactive material among the one or more radioactive materials as one or more monitored energy regions of the radioactive material;
    an image reconstruction module configured to perform image reconstruction on each of the monitored energy regions of each radioactive material among the one or more radioactive materials;
    a normalization module configured to perform normalization on images obtained through the image reconstruction such that maximum pixel values of the respective images are normalized to a same value to obtain normalized images; and
    a superimposing module configured to perform superimposing on the normalized images to form a composite image.

11. The gamma camera imaging device according to claim 10, wherein the selection module comprises:
    a peak-finding module configured to traverse the energy spectrums to find peaks and comparing the peaks with energies of branches of respective radioactive materials recorded in a predetermined nuclide bank to determine the one or more radioactive materials;
    a branch determination module configured to determine, for each radioactive material among the one or more radioactive materials, a part of branches of the radioactive material with a relatively higher branch ratio or lower energy as one or more branches of the radioactive material to be monitored; and
    an energy region determination module configured to determine, for each branch among the one or more branches of the radioactive material, an energy range centered on a central energy of the branch and having a width of a half-height width of a peak corresponding to the branch as one of the one or more monitored energy regions of the radioactive material.

12. The gamma camera imaging device according to claim 10, wherein the image reconstruction module comprises:

a closed region determination module configured to determine, for each of the images obtained through the image reconstruction, whether there is a closed area in the image; and an energy region adjustment module configured to adjust, in a case where there is a closed region in the image and if a ratio of contrast of the closed area with respect to contrast of a background area outside the closed area is less than a predetermined threshold, the energy ranges of the monitored energy regions corresponding to the image adaptively.

13. The gamma camera imaging device according to claim 12, wherein the energy region adjustment module is further configured to gradually expend or reduce an energy region to be adjusted in a predetermined energy step, until the ratio of contrast of the closed area with respect to contrast of a background area outside the closed area reaches the predetermined threshold.

14. The gamma camera imaging apparatus according to claim 12, wherein the image reconstruction module further comprises:

a discarding module configured to discard, in a case where there is not a closed region in the image, the energy ranges of the monitored energy regions corresponding to the image.

15. The gamma camera imaging device according to claim 12, wherein the image reconstruction module further comprises:

a discarding module configured to discard, in a case where there is not a closed region in the image, the energy ranges of the monitored energy regions corresponding to the image after a predetermined time period.

16. A gamma camera, comprising:
the gamma camera imaging device according to claim 10.

* * * * *